(12) United States Patent
Patel et al.

(10) Patent No.: US 8,911,792 B2
(45) Date of Patent: Dec. 16, 2014

(54) AMMONIACAL COPPER ZINC ARSENATE CONCENTRATES AND METHODS OF PREPARATION

(75) Inventors: Jayesh P. Patel, Stone Mountain, GA (US); Gloriana Kuswanto, Mableton, GA (US)

(73) Assignee: Arch Wood Protection, Inc., Atlanta, GA (US)

( * ) Notice: Subject to any disclaimer, the term of this patent is extended or adjusted under 35 U.S.C. 154(b) by 111 days.

(21) Appl. No.: 13/272,717

(22) Filed: Oct. 13, 2011

(65) Prior Publication Data

US 2012/0128791 A1  May 24, 2012

Related U.S. Application Data

(60) Provisional application No. 61/393,004, filed on Oct. 14, 2010.

(51) Int. Cl.
| | |
|---|---|
| *A01N 59/22* | (2006.01) |
| *A01P 3/00* | (2006.01) |
| *A01P 7/04* | (2006.01) |
| *A01P 15/00* | (2006.01) |
| *B27K 5/00* | (2006.01) |
| *C09D 15/00* | (2006.01) |
| *B27K 3/16* | (2006.01) |
| *B27K 3/20* | (2006.01) |
| *B27K 3/22* | (2006.01) |

(52) U.S. Cl.
CPC . *C09D 15/00* (2013.01); *B27K 3/16* (2013.01); *B27K 3/20* (2013.01); *B27K 3/22* (2013.01)
USPC ............ 424/623; 424/635; 424/641; 424/719

(58) Field of Classification Search
None
See application file for complete search history.

(56) References Cited

U.S. PATENT DOCUMENTS

| | | | |
|---|---|---|---|
| 3,945,834 A | 3/1976 | Clarke et al. | |
| 3,945,835 A | 3/1976 | Clarke et al. | |
| 4,038,086 A * | 7/1977 | Clarke et al. | 106/18.31 |
| 4,804,494 A | 2/1989 | Egerton et al. | |
| 2002/0146465 A1 | 10/2002 | Lloyd et al. | |

FOREIGN PATENT DOCUMENTS

| | | | | |
|---|---|---|---|---|
| CA | 568393 | * | 1/1959 | ............ 6/18 |

OTHER PUBLICATIONS

Material Safety Data Sheet, "Chemonite ACZA," <http://www.kellysolutions.com/erenewals/documentsubmit/KellyData%5CID%5Cpesticide%5CMSDS%5C62190%5C62190-34%5C62190-34_CHEMONITE_ACZA_6_15_2011_2_48_40_PM.pdf>, published Feb. 5, 2010, p. 1-17.*

Sigma-Aldrich, "Coper (II) oxide, CAS No. 1317-38-0," <http://www.sigmaaldrich.com/catalog/search?interface=CAS%20No.&term=1317-38-0&N=0&mode=match%20partialmax&focus=product&lang=en&region=US>, © 2014, p. 1.*

Arch Wood Protection, Inc., "Material Safety Data Sheet: Chemonite Treating Solution (R&D)", Apr. 1, 2010.

* cited by examiner

*Primary Examiner* — Tracy Vivlemore
*Assistant Examiner* — Monica Shin
(74) *Attorney, Agent, or Firm* — Lucas & Mercanti, LLP

(57) ABSTRACT

Disclosed herein is a composition concentrate that is suitable for treating wood upon dilution with water in a weight ratio of concentrate to water of between 1:10 and 1:100. The concentrate contains copper ammonium cations, zinc ammonium cations, arsenate and/or hydrogen arsenate anions; carbonate and/or bicarbonate anions, ammonia and water, wherein the total amount of copper and zinc is from 17% to about 22% by weight based on the total volume of the concentrate. Also disclosed is a process for producing ammoniacal copper zinc arsenate concentrate.

19 Claims, 1 Drawing Sheet

T-1  Pre-mix tank to pre-dissolve the zinc oxide in ammonia and ammonium bicarbonate or CO2
R-1  Pressure reactor
T-2  Dilution tank

AMMONIACAL COPPER ZINC ARSENATE CONCENTRATES AND METHODS OF PREPARATION

CROSS-REFERENCE TO RELATED APPLICATION

This application claims priority to U.S. provisional application 61/393,004, filed Oct. 14, 2010, the disclosure of which is incorporated herein by reference in its entirety.

FIELD OF THE INVENTION

The present invention relates to wood preservative formulations and methods. More particularly, the invention provides an improved method for preparing Ammoniacal Copper Zinc Arsenate (ACZA) preservative concentrates, and the super concentrated ACZA prepared therefrom.

BACKGROUND OF THE INVENTION

Wood preservatives have been used for more than a century. They are broadly classified as either waterborne or oil-type, based on the chemical composition of the preservative and the carrier used during the treating process. Exemplary commercial waterborne preservatives include Chromated Copper Arsenate (CCA), Ammoniacal Copper Zinc Arsenate (ACZA), Alkaline Copper Quaternary compounds (ACQ), Copper Azole (CA), Copper HDO (CuHDO), and borates.

Among the waterborne preservatives, ACZA is known to be particularly effective to penetrate Douglas-fir and various other difficult-to-treat soft wood species. It is used frequently in the Western United States, and protects wood against attack by decay fungi, insects, and most types of marine borers. ACZA typically is leach-resistant and can be used in a range of commercial and industrial applications. It is known that ACZA treated wood has protection both above ground and in ground contact, as well as in fresh and salt water environment.

ACZA contains copper (II), zinc, and arsenic ions in an ammoniacal solution and is a refinement of the original formulation ammoniacal copper arsenate (ACA), which is no longer available on the market. The method of preparing ACZA type of preservatives is known in the art. For example, U.S. Pat. No. 3,945,835 discloses the preparation of ammoniacal copper zinc arsenic solutions that contain a water-repellant additive by mixing zinc/copper carbonates or zinc/copper arsenate/arsenite with an organic acid and aqueous ammonia solution.

U.S. Pat. No. 4,038,086 discloses a method for making ammoniacal copper zinc arsenate solutions by mixing CAA and ZAA wherein CAA refers to a copper-ammonia-additive system containing As (V), and ZAA refers to a zinc-ammonia-additive system containing As (III) or As (V). This method is cumbersome as it involves the separate preparation of the copper-ammonia-additive-system and the zinc-ammonia-additive system, which requires duplicate reaction apparatus and processing steps. In addition, accordingly to the patentees, the concentrates prepared from this method contain zinc or a combination of zinc and copper ranging from about 4 up to about 15% by weight based on the volume of the preservative solution. This concentration is less than what otherwise might be desirable.

At present, the commercial ACZA wood preservative concentrate on the market is prepared at a wood treating facility by mixing arsenic acid, cuprous oxide, zinc oxide, and ammonium bicarbonate in aqueous ammonia. The concentrate is subsequently diluted to prepare a wood treating solution. Although it is a one step process to prepare ACZA concentrate using this technology, the process requires heat and addition of air to the reaction mixture in order to oxidize the cuprous oxide to the desired cupric compound. Addition of air to the reaction mixture is typically achieved by sparging air through the reaction mixture. Such sparging can result in the loss of ammonia as vapor/gas to the environment. The ammonia loss not only increases the cost of preparing ACZA, but also creates an environmental hazard as it is known that exposure to gaseous ammonia can pose a health hazard to humans and to aquatic animals.

In addition, the commercial process to prepare ACZA concentrate takes about 4 to 5 days for the reaction to complete. Further, the ACZA concentrate produced by the commercial method typically contains from 10 to 12% actives expressed as total weight percentage of CuO, ZnO and $As_2O_5$ based on the weight of the concentrate. Unfortunately, it is not as economical as might be desired to ship ACZA with such a low level of actives. For this reason, currently, the ACZA concentrate is produced on site at wood treating facilities rather than at chemical manufacturing facilities.

Accordingly, there exists a need in the wood preservatives manufacturing community for a super concentrated ACZA composition that can be produced in a one step reaction that does not entail sparging with oxygen or air, which can be completed in relatively short time, as compared to the conventional commercial process for making more diluted concentrates. This invention provides an answer to that need.

SUMMARY OF THE INVENTION

In one aspect, the present invention relates to a process for producing an ammoniacal copper zinc arsenate composition concentrate. The process includes reacting a reaction mixture containing cupric oxide (i.e., copper II oxide), zinc oxide, arsenic acid, ammonia, and ammonium bicarbonate or carbon dioxide in order to provide the composition concentrate. If ammonium bicarbonate is used, the weight ratio of ammonium bicarbonate:ammonia:zinc oxide:arsenic pentoxide in the arsenic acid:copper (II) oxide in the reaction mixture is within a range of ratios of 0.8-1.2:1.2-1.8:0.3-0.7:0.3-0.7:1.0. If carbon dioxide is used, the weight ratio of carbon dioxide:ammonia:zinc oxide:arsenic pentoxide in the arsenic acid:copper (II) oxide in the reaction mixture is within a range of ratios of 0.4-0.8:1.5-2.0:0.3-0.7:0.3-0.7:1.0.

In another aspect, the present invention relates to an ammoniacal copper zinc arsenate composition concentrate prepared by the above described process. The composition concentrate is suitable for treating wood upon dilution with water in a ratio of concentrate to water of between 1:10 and 1:100. The concentrate contains copper ammonium cations, zinc ammonium cations, arsenate and/or hydrogen arsenate anions; carbonate and/or bicarbonate anions, ammonia and water, wherein the total amount of copper and zinc is from 17% to about 22% by weight based on the total volume of the concentrate.

These and other aspects will become apparent upon reading the detailed description of the invention.

DETAILED DESCRIPTION

Figure 1:
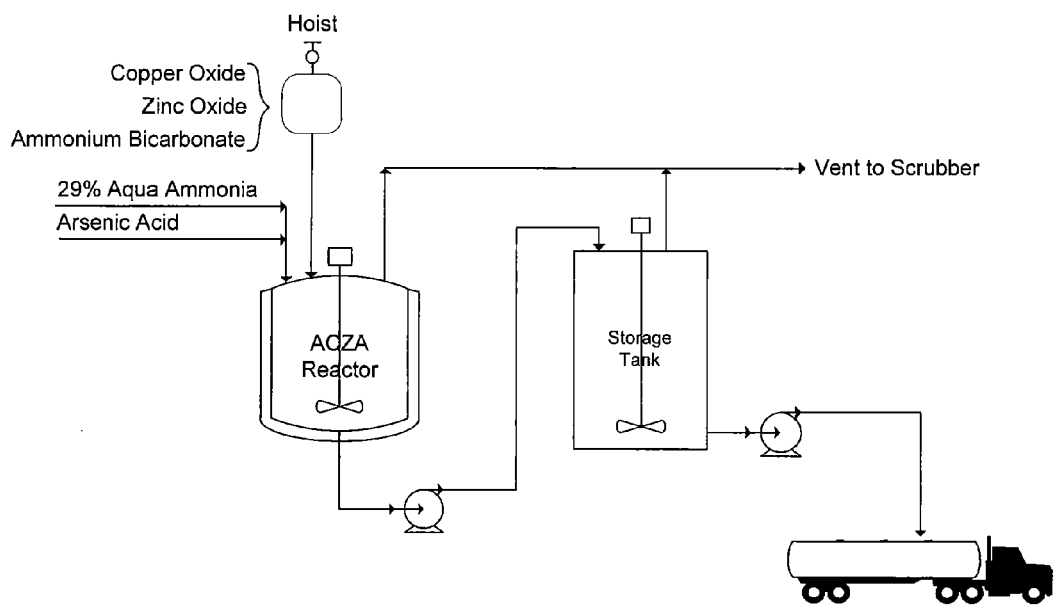
FIG. 1 illustrates a batch process to prepare the composition concentrate of the invention.

It has now been surprisingly found that concentrated ammoniacal copper zinc arsenate formulations, having a higher concentration of actives than was heretofore achievable, can be produced by reacting copper (II) oxide, zinc oxide, arsenic acid, ammonia, and ammonium bicarbonate or carbon dioxide. Compared to the conventional commercial process to make ACZA concentrates, the process of the invention does not require sparging air or oxygen into the reaction mixture thus minimizing the risk of passing ammonia into the environment via the sparging gas. In addition, the reaction time is reduced from 4 to 5 days required by the conventional commercial process, to 24 hours or less.

Further, it has now been surprisingly found that the concentrates prepared by the process of the invention contain a higher amount of actives than is achievable by means of the conventional commercial process. A concentrate having a higher concentration of actives helps minimizing shipping costs as compared to more dilute concentrates, thus enabling the ACZA concentrates to be prepared in chemical manufacturing facilities that are remote from the wood treating facilities utilizing the concentrates. In other words, the concentrate can then be economically transported to wood treatment plants where it is diluted to provide ready to use wood preservative compositions.

Accordingly, in one embodiment, the present invention is directed to a process to prepare ammoniacal copper zinc arsenate composition concentrate. The process includes reacting a reaction mixture containing copper (II) oxide, zinc oxide, arsenic acid, ammonia, and ammonium bicarbonate or carbon dioxide in order to provide the composition concentrate.

In one embodiment, the reaction mixture consists essentially of copper (II) oxide, zinc oxide, arsenic acid, aqueous ammonia, and ammonium bicarbonate or carbon dioxide. As used herein, "consisting essentially of" is intended to mean that at least 95%, preferably 99% of the reaction mixture consists of the above described reactants.

The ratios of the reactants varies depending on whether ammonium bicarbonate is pre-formed or generated in situ. If ammonium bicarbonate is used, the weight ratio of ammonium bicarbonate:ammonia:zinc oxide:arsenic pentoxide in the arsenic acid:copper (II) oxide is within a range of ratios of 0.8-1.2:1.2-1.8:0.3-0.7:0.3-0.7:1.0, preferably, 1.0:1.5:0.5:0.5:1.0. If carbon dioxide is used, the weight ratio of carbon dioxide:ammonia:zinc oxide:arsenic pentoxide in the arsenic acid:copper (II) oxide is within a range of ratios of 0.4-0.8:1.5-2.0:0.3-0.7:0.3-0.7:1.0, preferably 0.6:1.8:0.5:0.5:1.0.

All reactants utilized in the process of the invention are known and available commercially. The sources and the grades of the reactants are not particularly limited. In one embodiment, the ammonia used is in the form of a liquid ammonia which contains from about 25% to about 35% by weight of ammonia. The arsenic acid used is an aqueous solution which contains from about 70% to about 80% by weight of arsenic acid.

It should be noted that according to the process of the invention, the reaction can be carried out at atmospheric pressure or it can be carried out at super atmospheric pressure. The reaction temperature can range from about 5 to about 50° C. In one embodiment, the reaction is carried out at ambient temperature and no heating is needed.

Once the reaction is started, the reaction will continue for a period of time varying anywhere from a few hours to a day or more, preferably from about 2 hours to about 24 hours, more preferably form about 4 hours to about 8 hours.

The process of the invention can be a batch process or a continuous process. In the batch process, all the reactants are added to a reactor equipped with an agitator and heating and cooling capabilities. Then the reactants are allowed to react under the conditions described above to provide the composition concentrate. One batch process according to the invention is illustrated in FIG. 1. In the process, aqueous ammonia is first added to a jacketed reactor equipped with an agitator and heating/cooling capabilities. Then copper (II) oxide, zinc oxide and ammonium bicarbonate are added to the reactor followed by arsenic acid. The temperature of the reaction mixture is controlled to be between about 40 and 55° C. After all the copper (II) oxide, zinc oxide dissolve, the composition concentrate can be cooled and transferred to a storage tank.

Figure 2:
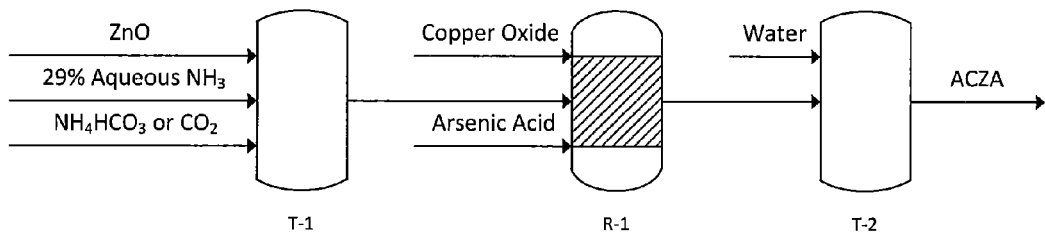
FIG. 2 illustrates a continuous process to prepare the composition concentrate of the invention.

Suitable continuous processes are not particularly limited. In one embodiment as shown in FIG. 2, zinc oxide is first pre-dissolved in a composition containing aqueous ammonia and ammonium bicarbonate or carbonate dioxide in Tank T-1. Then the dissolved zinc oxide composition is transferred to reactor R-1, where copper (II) oxide and arsenic acid can be add. The reactants are then allowed to react in the reactor R-1. Once the reaction is completed, the reaction product can be transferred to tank T-2, where water can be added to adjust the concentration of the actives.

The chemistry of the dissolution of copper (II) oxide and zinc oxide in ammonia and ammonium bicarbonate solutions is complicated. Illustratively, it can be described by the following overall equations as:

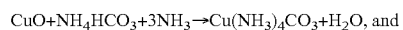

$$CuO + NH_4HCO_3 + 3NH_3 \rightarrow Cu(NH_3)_4CO_3 + H_2O, \text{ and}$$

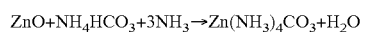

$$ZnO + NH_4HCO_3 + 3NH_3 \rightarrow Zn(NH_3)_4CO_3 + H_2O$$

Since arsenic acid is used in the reaction, exemplary other copper and zinc species could be written as: $Cu(NH_3)_4 HAsO_4$ and $Zn(NH_3)_4 HAsO_4$.

Accordingly, in another embodiment, the present invention provides an ammoniacal copper zinc arsenate concentrate prepared by the process described above. The concentrate contains copper ammonium cations, zinc ammonium cations, arsenate and/or hydrogen arsenate anions, carbonate and/or bicarbonate anions, ammonia and water, wherein the total amount of copper and zinc is from 17% to about 22% by weight based on the total volume of the concentrate.

Preferably, the total amount of actives in the concentrate is from 22 wt % to about 26 wt % based on the total weight of zinc oxide, copper (II) oxide and arsenic (V) pentoxide over the total weight of the concentrate.

In the ACZA concentrate of the invention, the weight ratio of copper/zinc/arsenic is within a range of ratios of 1.0/0.3-0.7/0.3-0.7, preferably 1.0/0.5/0.5 based on the weight of copper (II) oxide, zinc oxide, and arsenic (V) pentoxide. The weight ratio of ammonia/copper is within a range of ratios of 0.9-1.8/1.0, preferably 1.5/1.0 based on the weight of ammonia and copper (II) oxide. The weight ratio of carbonate and/or bicarbonate/copper is within a range of ratios of 0.8-1.2/1.0, preferably 1:1 based on the weight of ammonium bicarbonate and copper (II) oxide.

The ACZA concentrate of the invention can be diluted to make a less concentrated ACZA composition. It can also be diluted further with water in a weight ratio of concentrate to water of between 1:10 and 1:100 to make a ready to use composition.

The following examples are intended to illustrate, but in no way limit the scope of the present invention. All parts and percentages are by weight and all temperatures are in degrees Celsius unless explicitly stated otherwise. All publications disclosed herein are incorporated by reference in their entireties.

EXAMPLES

Example 1

Preparation of a 16% ACZA Actives Concentrate 47.17 grams of copper (II) oxide (87%) and 20.65 grams of zinc oxide (97%) were added to an aqueous solution containing 190.32 grams of aqueous ammonia (29%), 37.80 grams of ammonium bicarbonate (98%), 33.50 grams of arsenic acid (75%), and 175.50 grams of water. The reaction mixture was stirred at ambient temperature for three days. The resulting solution was analyzed for copper, zinc and arsenic using Inductively Coupled Plasma (ICP) spectroscopy. The analyzed and calculated weight percentages of copper, zinc and arsenic in the form of copper, zinc and arsenic oxides are shown in Table 1.

TABLE 1

Analysis of a 16% ACZA Concentrate Made Using Copper (II) Oxide

| Component Oxide | Calculated, Wt. % | Measured, Wt. % |
|---|---|---|
| Copper (II) Oxide, CuO | 7.81 | 7.30 |
| Zinc Oxide, ZnO | 3.98 | 3.79 |
| Arsenic (V) Pentoxide, $As_2O_5$ | 4.05 | 3.84 |
| Total Oxides | 15.84 | 14.93 |

In the ACZA concentrate, the weight ratio of ammonia to copper (II) oxide is 1.40, and the weight ratio of ammonium bicarbonate to copper (II) oxide is 0.94.

Example 2

Preparation of a 22% ACZA Actives Concentrate 76.35 grams of copper (II) oxide (87%) and 34.05 grams of zinc oxide (97%) were added to an aqueous solution containing 371.00 grams of aqueous ammonia (29%), 67.60 grams of ammonium bicarbonate (98%), and 53.70 grams of arsenic acid (77.3%). The reaction was completed within an 18 hour period of time. The prepared ACZA concentrate was analyzed by ICP techniques and the results are given in Table 2.

TABLE 2

Analysis of a 22% ACZA Concentrate Made Using Copper (II) Oxide

| Component Oxide | Calculated, Wt. % | Measured, Wt. % |
|---|---|---|
| Copper (II) Oxide, CuO | 11.01 | 10.97 |
| Zinc Oxide, ZnO | 5.48 | 5.63 |
| Arsenic (V) Pentoxide, $As_2O_5$ | 5.41 | 5.85 |
| Total Oxides | 21.90 | 22.45 |

In the ACZA concentrate, the weight ratio of ammonia to copper (II) oxide is 1.62, and the weight ratio of ammonium bicarbonate to copper (II) oxide is 1.00.

Example 3

Preparation of a 25% ACZA Actives Concentrate

An aqueous ammonia mixture was prepared by mixing 60.21 grams of arsenic acid (75%) with a solution containing 351.00 grams of aqueous ammonia (29%) and 69.89 grams of ammonium bicarbonate (98%). It was noted that the temperature of the solution increased from ambient to approximately 50° C. on addition of the arsenic acid. To the aqueous ammonia mixture were added 83.04 grams of copper (II) oxide (87%) and 37.32 grams of zinc oxide (98%). This mixture was stirred for 18 hours and analyzed for copper, zinc and arsenic by ICP methods. The results are presented in Table 3.

TABLE 3

Analysis of a 25% ACZA Concentrate Made Using Copper (II) Oxide

| Component Oxide | Calculated, Wt. % | Measured, Wt. % |
|---|---|---|
| Copper (II) Oxide, CuO | 12.01 | 12.17 |
| Zinc Oxide, ZnO | 6.02 | 6.21 |
| Arsenic (V) Pentoxide, $As_2O_5$ | 6.08 | 6.87 |
| Total Oxides | 24.11 | 25.25 |

In the ACZA concentrate, the weight ratio of ammonia to copper (II) oxide is 1.41, and the weight ratio of ammonium bicarbonate to copper (II) oxide is 0.95.

Example 4

Preparation of 22% ACZA Actives Concentrate Using $CO_2$ and Pressure Reactor An aqueous ammonia mixture was prepared by mixing 182.90 grams of arsenic acid (75%) with a solution containing 1109.00 grams of aqueous ammonia (29%) and 124.00 grams of carbon dioxide ($CO_2$). It was noted that the temperature of the solution increased from ambient to approximately 50° C. on addition of the arsenic acid and carbon dioxide. To the aqueous ammonia mixture were added 249.50 grams of copper (II) oxide (89%) and 111.00 grams of zinc oxide (99%). This mixture was stirred for 18 hours and analyzed for copper, zinc and arsenic by ICP methods. The results are presented in Table 4.

TABLE 4

Analysis of a 25% ACZA Concentrate Made Using Copper (II) Oxide and $CO_2$

| Component Oxide | Calculated, Wt. % | Measured, Wt. % |
|---|---|---|
| Copper (II) Oxide, CuO | 10.97 | 10.64 |
| Zinc Oxide, ZnO | 5.50 | 5.54 |
| Arsenic (V) Pentoxide, $As_2O_5$ | 5.50 | 5.66 |
| Total Oxides | 21.97 | 21.84 |

In the ACZA concentrate, the weight ratio of ammonia to copper (II) oxide is 1.45, and the weight ratio of carbon dioxide to copper (II) oxide is 0.56.

Comparative Example 1

Preparation of a 30% ACZA Concentrate 102.6 grams of copper (II) oxide (88%) and 45.00 grams of zinc oxide (100%) were added to an aqueous solution containing 293.00 grams of aqueous ammonia (29%), 92.60 grams of ammonium bicarbonate (97%) and 72.00 grams of arsenic acid (77.3%). The reaction was completed within an 18 hour period of time. The prepared ACZA concentrate was analyzed by ICP techniques and the results are given in Table 5.

TABLE 5

Analysis of a 30% ACZA Concentrate Made Using Copper (II) Oxide

| Component Oxide | Calculated, Wt. % | Measured, Wt. % |
|---|---|---|
| Copper (II) Oxide, CuO | 15.01 | 13.9 |
| Zinc Oxide, ZnO | 7.50 | 7.42 |
| Arsenic (V) Pentoxide, $As_2O_5$ | 7.50 | 7.64 |
| Total Oxides | 30.01 | 28.96 |

In the ACZA concentrate, the weight ratio of ammonia to copper (II) oxide is 0.94, and the weight ratio of ammonium bicarbonate to copper (II) oxide is 0.99. Precipitates were observed after the concentrate was allowed to stay at room temperature for an extended amount of time.

Example 5

Kinetic Study for Preparation of a 22% ACZA Concentrate Using Copper (II) Oxide An aqueous ammonia mixture was prepared by adding 90.21 grams of ammonium bicarbonate (98%) to 498.00 grams of aqueous ammonia (29%). To this was added 99.20 grams copper (II) oxide (89%) and 44.40 grams of zinc oxide (98%). The mixture was stirred for 5 minutes and a sample of the solution was removed for ICP analysis. Then 71.00 grams of arsenic acid (77.3%) was added and the mixture was stirred for another minute, after which time a second sample was taken for analysis. This process was continued for one hour. To insure all solids were removed, the individual samples were centrifuged and filtered through a 0.5 micron syringe filter prior to ICP analysis. The results of this study are shown in Table 6.

TABLE 6

Kinetic Study of Copper (II) Oxide Dissolution to Prepare AZCA Concentrate

| Time, mins. | Sample No. | Sample Wt., g | Weight Percent | | | |
|---|---|---|---|---|---|---|
| | | | CuO | ZnO | $As_2O_5$ | Total |
| 5 min | 1 | 5.50 | 5.41 | 6.74 | 0 | 12.15 |
| 1 min | 2 | 6.47 | 9.50 | 5.55 | 5.43 | 20.48 |
| 5 min | 3 | 5.68 | 9.91 | 5.41 | 5.36 | 20.68 |
| 10 min | 4 | 5.35 | 10.17 | 5.45 | 5.33 | 20.95 |
| 15 min | 5 | 5.93 | 9.84 | 5.38 | 5.33 | 20.55 |
| 20 min | 6 | 5.72 | 10.18 | 5.36 | 5.36 | 20.90 |
| 25 min | 7 | 5.73 | 10.41 | 5.63 | 5.46 | 21.50 |
| 30 min | 8 | 5.79 | 9.98 | 5.27 | 5.25 | 20.50 |
| 35 min | 9 | 5.76 | 10.51 | 5.56 | 5.53 | 21.60 |
| 40 min | 10 | 6.03 | 10.15 | 5.33 | 5.31 | 20.79 |
| 45 min | 11 | 6.45 | 10.16 | 5.32 | 5.26 | 20.74 |
| 60 min | 12 | 6.32 | 10.54 | 5.50 | 5.47 | 21.51 |

These data suggest that zinc oxide readily dissolves in the ammonia/ammonium bicarbonate solution whereas only about half of the copper (II) oxide dissolves. The moles of ammonium bicarbonate are calculated to be 1.14 moles in the vessel. The moles of zinc oxide are calculated to be 0.55. The total weight of the mixture was 802.81 grams. Using the total mixture weight and the 5.41% copper (II) oxide in solution after 10 minutes of mixing without the addition of arsenic acid, one can calculate that approximately 0.55 moles of copper (II) oxide dissolved at this time. These data indicate that zinc oxide is preferentially dissolved by ammoniacal ammonium bicarbonate solutions over copper (II) oxide. The arsenic acid interaction with the ammonia solution generates ammonium hydrogen arsenate salts which complete the dissolution reaction with copper (II) oxide.

The dissolution of both copper (II) oxide and zinc oxide were completed within minutes of their addition to an aqueous ammonia solution containing ammonium bicarbonate and arsenic acid. For this reaction, the weight ratio of ammonia to copper (II) oxide is 1.71, and the weight ratio of ammonium bicarbonate to copper (II) oxide is 1.00.

The theoretical yield of dissolved copper (II) oxide is 11.00 percent. The above results indicate that 95.8 percent of the copper (II) oxide was dissolved within 60 minutes. Small losses of solid copper (II) oxide would be anticipated due to sampling and thus lower the overall copper (II) oxide dissolution yield.

Comparative Example 2

Kinetic Study for Preparation of ACZA Concentrate Using Copper (I) (Cuprous) Oxide In order to obtain information on the rate of copper (I) oxide dissolution, example 6 was repeated by substituting copper (II) oxide used in example 5 with copper (I) oxide.

98.18 grams of ammonium bicarbonate (98%) was added to 521.00 grams of aqueous ammonia (29%) to provide an aqueous ammoniacal solution. Zinc oxide, 44.50 grams (98%), and 80.12 grams of copper (I) oxide were added to the aqueous ammoniacal solution. Since copper (I) requires oxygen for the oxidation of copper (I) to copper (II), an air sparge was placed into the reaction vessel. As in Example 5, this mixture was stirred for 10 minutes and a sample was removed, centrifuged and analyzed as above by ICP techniques. Arsenic acid, 70.35 (77.3%), was added and the mixture was stirred. Samples were removed at various intervals and centrifuged and analyzed by ICP. The results are provided in Table 7.

TABLE 7

Kinetic Study of Copper (I) (Cuprous) Oxide Dissolution to AZCA Concentrate

| Time, mins. | Sample No. | Sample Wt., g | Weight Percent | | | |
|---|---|---|---|---|---|---|
| | | | CuO | ZnO | $As_2O_5$ | Total |
| 5 min | 1 | 5.36 | 0 | 6.30 | 0 | 6.30 |
| 1 min | 2 | 5.95 | 6.92 | 5.76 | 4.45 | 17.13 |
| 5 min | 3 | 5.51 | 7.87 | 5.83 | 5.40 | 19.10 |
| 10 min | 4 | 5.61 | 7.94 | 5.76 | 5.45 | 19.15 |
| 15 min | 5 | 5.77 | 8.10 | 5.37 | 5.46 | 18.93 |
| 20 min | 6 | 6.00 | 8.19 | 5.45 | 5.45 | 19.09 |
| 25 min | 7 | 5.67 | 8.39 | 5.84 | 5.57 | 19.80 |
| 30 min | 8 | 5.47 | 8.19 | 5.65 | 5.39 | 19.23 |
| 35 min | 9 | 5.17 | 8.30 | 5.69 | 5.39 | 19.38 |
| 40 min | 10 | 5.50 | 8.38 | 5.74 | 5.46 | 19.58 |
| 45 min | 11 | 5.58 | 8.30 | 5.67 | 5.40 | 19.37 |
| 60 min | 12 | 5.93 | 8.44 | 5.68 | 5.40 | 19.52 |

The data indicate that the reaction of copper (I) oxide with ammonium bicarbonate in aqueous ammonia and oxygen from an air sparge is slow. No copper (I) oxide dissolution was found after 5 minutes in the ammoniacal ammonium bicarbonate solution sparged with air. The dissolution rate increased substantially upon addition of the arsenic acid to the mixture, but appeared to level off after only 20 minutes of mixing and air sparging. The calculated yield of dissolved copper, expressed as CuO, is 10.93 percent. Thus, only some 77.2 percent of cuprous oxide was in solution after 60 minutes. This leveling off may be the cause of the excessively long reaction time (as long as 4-5 days) observed when commercial wood treaters make Chemonite™ (ACZA) concentrates at their treatment plants.

While the invention has been described above with references to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:

1. An ammoniacal copper zinc arsenate (ACZA) concentrate that is suitable for treating wood upon dilution with water in a weight ratio of concentrate to water of between 1:10 and 1:100, said concentrate comprising copper in the form of copper ammonium cations, zinc in the form of zinc ammonium cations, arsenic in the form of arsenate and/or hydrogen arsenate anions, carbonate and/or bicarbonate anions, ammonia and water, wherein the total amount of copper and zinc is from 17.0% to about 22% by weight based on the total volume of the concentrate.

2. The concentrate of claim 1 wherein weight ratios of copper, zinc and arsenic are expressed as weight ratios of copper (II) oxide, zinc oxide, and arsenic (V) pentoxide, respectively, and are within a range of ratios of 1.0/0.3-0.7/0.3-0.7 based on the weight of copper (II) oxide, zinc oxide, and arsenic (V) pentoxide.

3. The concentrate of claim 2 wherein the weight ratio of copper/zinc/arsenic is 1.0/0.5/0.5 based on the weight of copper (II) oxide, zinc oxide, and arsenic (V) pentoxide.

4. The concentrate of claim 1 wherein weight ratios of copper, zinc and arsenic are expressed as weight ratios of copper (II) oxide, zinc oxide, and arsenic (V) pentoxide, respectively, and ammonia/copper are in a weight ratio of 1.2-1.8/1.0 based on the weight of ammonia and copper (II) oxide.

5. The concentrate of claim 4 wherein the weight ratio of ammonia/copper is 1.5/1 based on the weight of ammonia and copper (II) oxide.

6. The concentrate of claim 1 wherein weight ratios of copper, zinc and arsenic are expressed as weight ratios of copper (II) oxide, zinc oxide, and arsenic (V) pentoxide, respectively, and carbonate and/or bicarbonate/copper are in a weight ratio of 0.8-1.2/1.0 based on the weight of ammonium bicarbonate and copper (II) oxide.

7. The concentrate of claim 6 wherein the weight ratio of carbonate and/or bicarbonate/copper is 1/1 based on the weight of ammonium bicarbonate and copper (II) oxide.

8. A process for producing a composition concentrate comprising reacting a reaction mixture containing copper (II) oxide, zinc oxide, arsenic acid, ammonia, and ammonium bicarbonate or carbon dioxide in order to provide the composition concentrate, wherein the total amount of copper and zinc in the composition concentrate is from 17.0% to about 22% by weight based on the total volume of the concentrate.

9. The process of claim 8 wherein ammonium bicarbonate is generated in situ by reacting ammonia with carbon dioxide.

10. The process of claim 8 wherein the reaction mixture contains ammonium bicarbonate and the weight ratio of ammonium bicarbonate:ammonia:zinc oxide:arsenic pentoxide in the arsenic acid:copper (II) oxide is within a range of ratios of 0.8-1.2:1.2-1.8:0.3-0.7:0.3-0.7:1.0.

11. The process of claim 10 wherein the weight ratio of ammonium bicarbonate:ammonia:zinc oxide:arsenic pentoxide in the arsenic acid:copper (II) oxide is within a range of ratios of 1.0:1.5:0.5:0.5:1.0.

12. The process of claim 9 wherein the reaction mixture contains carbon dioxide and the weight ratio of carbon dioxide:ammonia:zinc oxide:arsenic pentoxide in the arsenic acid:copper (II) oxide is within a range of ratios of 0.4-0.8:1.5-2.0:0.3-0.7:0.3-0.7:1.0.

13. The process of claim 12 wherein the weight ratios of carbon dioxide:ammonia: zinc oxide:arsenic pentoxide in the arsenic acid:copper (II) oxide is 0.6:1.8:0.5:0.5:1.0.

14. The process of claim 8 wherein the reaction mixture is reacted under super atmospheric pressure.

15. The process of claim 8 wherein the process is a batch process.

16. The process of claim 8 wherein the process is a continuous process.

17. An ammoniacal copper zinc arsenate (ACZA) composition concentrate produced by a process which comprises:
reacting a mixture containing copper (II) oxide, zinc oxide, arsenic acid, ammonia and ammonium bicarbonate or carbon dioxide in order to provide the composition concentrate, wherein the total amount of copper and zinc is from 17.0% to about 22% by weight based on the total volume of the concentrate.

18. The concentrate of claim 1 wherein the total amount of copper and zinc is from 18.0% to about 22% by weight based on the total volume of the concentrate.

19. The concentrate of claim 17 wherein the total amount of copper and zinc is from 18.0% to about 22% by weight based on the total volume of the concentrate.

* * * * *